Jan. 18, 1966     C. GAGNIERE     3,230,424
METHOD AND APPARATUS FOR THE PROTECTION OF A DIRECT-CURRENT
SYSTEM WITH BOTH POLES INSULATED
Filed Feb. 5, 1963
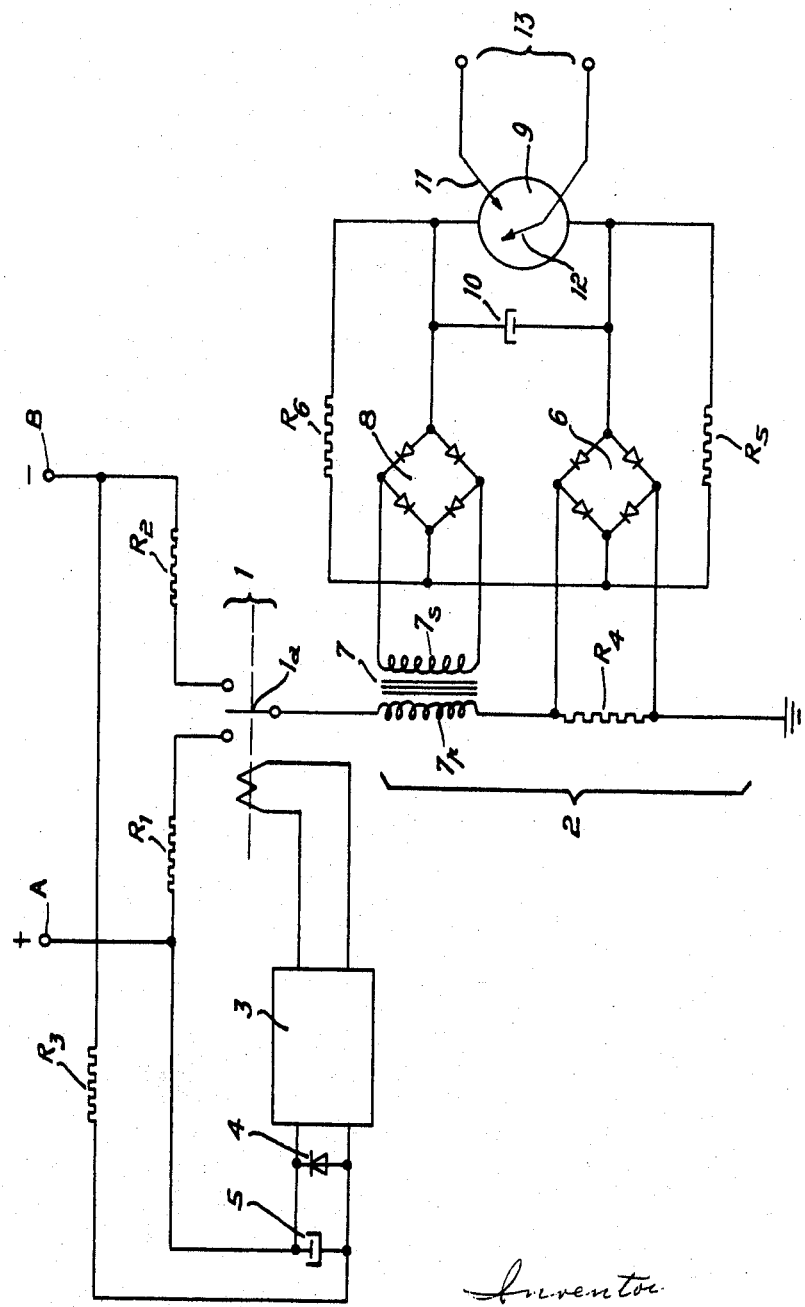

United States Patent Office 3,230,424
Patented Jan. 18, 1966

1

3,230,424
METHOD AND APPARATUS FOR THE PROTECTION OF A DIRECT-CURRENT SYSTEM WITH BOTH POLES INSULATED
Claude Gagniere, Parc Hebert, Nogent-sur-Oise, Oise, France, assignor to Charbonnages de France, Paris, France, a public institution of France
Filed Feb. 5, 1963, Ser. No. 256,803
Claims priority, application France, Feb. 15, 1962, 888,186
7 Claims. (Cl. 317—10)

The present invention relates to the supervision of the insulation and the protection of a direct-current system having both poles insulated.

Protection devices for systems of this kind are already known which comprise a reversing relay permitting alternative checking of the insulation of each of the two poles by means of a resistance circuit to earth, the said circuit comprising current-measuring means. Devices of this kind have the advantage that they provide detection of balanced faults on both poles, but as a result of the line capacities, there is a charge and discharge of these line capacities at every switching operation, thus causing the passage of a current in the detection circuit connected to earth. The average value of this current increases as the switching frequency of the reversing relay increases.

The main disadvantage of such devices results from the fact that the current-measuring instrument is traversed in normal service on a non-faulty network by a current which cannot be distinguished from the current produced by a fault. In addition, when a fault arises, it is not possible to measure this in an accurate manner, since to the current caused by the fault, there is added at every instant an exponentially-varying current due to the charge and discharge of the line capacities. In practice, the devices of this kind only act for switching and measurement at fairly long intervals of time, of the order of several multiples of ten seconds. It will readily be understood that such a frequency of supervision of the insulation of a system cannot comply with the conditions of safety which are essential in many cases in practice.

The object of the present invention is to provide a new method and new apparatus which permit the supervision of the insulation of a system of the type previously described, at a frequency of less than one second and which also make it possible to obtain an accurate and recordable quantitative measurement to be continuously obtained of the insulation of the system with respect to earth.

The method according to the invention consists in alternately connecting at a frequency less than one second, each of the poles of the system to earth through the intermediary of a rectifying detection system in which the variations of the rectified signal due to the charge and discharge of the line capacities are compensated by a signal obtained by transformation of the variable current circulating in the said detection circuit.

The apparatus according to the invention comprises:

A reversing relay by which each of the poles of the system are alternately connected to earth at a frequency less than one second, through the intermediary of a detection circuit.

A detection circuit to earth comprising a resistance to the terminals of which is connected a first rectifier device loaded by a resistance, a transformer having its primary in series in the said detection circuit while its secondary is connected to the terminals of a second rectifier device loaded by a resistance, the two rectifier devices being connected in opposition through the intermediary of a galvanometer device to the terminals of which is connected a condenser.

The reversing relay may be of any type known per se, on condition that it is capable of carrying out the frequent switching which is required from it. In practice, the relay must be able to ensure at least three to four switching cycles per second, which represents a reasonable frequency according to the applicants' experience. The relay may for example be of the electro-magnetic type operated by a multi-vibrator, or of the type with two photo-resistances with alternate illumination.

With regard to the galvanometer device, this may also be of any known type, for example a simple milliammeter with or without contact, or other current-detection device with or without amplification.

Other characteristic features and advantages of the present invention will become apparent from the description which follows below with reference to the accompanying drawing which shows by way of example only and not in any limitative sense, one possible circuit diagram of a device for supervision of the insulation and protection of a direct-current system with both its poles insulated, in accordance with the present invention.

In the drawing, A and B represent the two poles of the direct-current network which it is desired to protect by supervising its insulation with respect to earth.

According to the invention, the said poles A and B are alternately connected to earth through the intermediary of a reversing relay which has been given the general reference 1, the blade 1a of the relay connects the poles A and B alternately, at a frequency less than one second and through the resistances $R_1$ and $R_2$, with a rectifier detection circuit designated by the general reference 2, which is connected in turn to earth, and which will be described in more detail below.

The operation of the reversing relay 1 is advantageously effected by a transistor multivibrator of any known type, shown diagrammatically at 3, and connected in turn to the poles A and B through the intermediary of a resistance $R_3$ and supplied at constant voltage having a negligible alternating component by means of a Zener-effect diode 4 and a condenser 5.

It is quite clear that the reversing relay may be of any type known per se, provided that it is able to ensure the frequent switching which it is intended to effect. Following tests made by the applicants, the relay must be able in practice to carry out at least three to four switching cycles per second. The said relay may for example be advantageously either of the electro-magnetic type actuated by a multi-vibrator, as shown in the drawing, or of the type with two photo-resistances with alternating illumination.

The detection circuit 2 is essentially constituted:

By a resistance $R_4$, to the terminals of which is connected a first rectifier bridge 6 loaded by a resistance $R_5$.

By a transformer 7, of which the primary $7p$ is connected in series in the said detection circuit, and the terminals of the secondary $7s$ are connected to a second rectifier bridge 8 loaded by a resistance $R_6$.

It should be noted that the resistance $R_4$ is preferably adjustable in order to balance the output voltages of the rectifiers 6 and 8.

Following a characteristic feature of the circuit, the two rectifier devices 6 and 8 are connected in opposition by means of a galvanometer device 9, to the terminals of which is connected an integrating condenser 10.

It is quite evident that the galvanometer device may be of any known type, such as for example a simple milliammeter preferably provided with a contact 11 which, as soon as the deflection of the needle 12 reaches a predetermined value corresponding to a certain value of an insulation fault, as will be seen in more detail later, causes the operation of an alarm device or the tripping of the circuit-breaker apparatus controlling the system to be protected, through the intermediary of any appropriate control circuit connected to the terminals of the circuit shown diagrammatically at 13.

Without departing from the scope of the present invention, it would also be possible to utilize as a galvanometer device any other current-detection apparatus with or without amplification.

Furthermore, the transformer 7 has characteristics such that the signal delivered by the rectifier device 8 acts in opposition to the passage of the current through the galvanometer device 9 during the whole time of variation of the output signal from the rectifier device 6 which is due to the charge and discharge currents of the capacities of the largest system which must be protected, which enables the influence of the capacities of the system on the sensitivity of the detection apparatus 9 (such as is normally the case with the systems known at the present time) to be completely eliminated.

It is furthermore important to observe that the integration condenser 10 coupled to the terminals of the galvanometer device 9 not only enables the oscillations of this measuring instrument to be suppressed, but also in the event of a double balanced fault occurring on the network to be protected, enables a deflection corresponding to that of a single fault of the same value to be read on the measuring instrument, in contrast with the systems known at the present time, in which the current which passes through the measuring instrument in the case of a double balanced fault is one-half the current passing through the same instrument in the case of a single fault having the same resistance.

In the operation of this system direct current from faults is supplied to the galvanometer device 9 through first rectifier bridge 6 but does not pass through transformer 7 and therefore does not appear to galvanometer device 9 at the second rectifier bridge 8 while current, due to the discharge of the line capacities, can pass through transformer 7 and appear at second rectifier bridge 8 and also appear at first rectifier bridge 6, but in such manner as to cancel out each other at the galvanometer device 9.

Therefore with no fault at either pole A or B, there is no reading on galvanometer device 9, since current due to the discharge of the line capacities at both rectifiers 6 and 8 is always cancelled in galvanometer device 9.

If a double fault occurs at both poles A and B, there will still be a cancelling of currents due to the discharge of line capacities at galvanometer device 9. But the current through galvanometer device 9 from the fault is still supplied through rectifier bridge 6 and is not cancelled by any current from rectifier bridge 8. During the open time of relay 1 galvanometer device 9 will continue to read approximately at the value of the fault current although this fault current is no longer passing through rectifier bridge 6 because of the discharge from condenser 10 through galvanometer device 9 thereby suppressing oscillations that would otherwise take place in galvanometer device 9.

If a single fault occurs at either pole A or B, there is still the same cancellation of currents due to the discharge of line capacities and again as in the case of the double fault, there is a reading of fault current through rectifier bridge 6 while relay 1 is connected to the pole having the fault, but in this particular case the discharge of condenser 10, which starts with the opening of the relay 1 to the faulty pole, continues even during the time of connection to the non-faulty pole, thereby continuing the reading on galvanometer device 9 at only a slightly decreased value and unaffected by currents which are cancelled while connection is made to the non-faulty pole.

This reading of the discharging value of condenser 10 on galvanometer device 9 continues until relay 1 is again connected to the pole having the fault, at which time the reading of the fault line is again shown on galvanometer device 9.

It will of course be understood that the invention has only been described and shown purely by way of explanation and not in any limitative sense, and that modifications of detail may be made thereto without thereby departing from the scope of the said invention.

I claim:

1. A system for ensuring the protection and supervision of the insulation of a direct-current electrical network, the two poles of which are insulated from earth, comprising:

switching means for alternately connecting at a frequency less than one second, each of the two poles of the network to earth;

a detection circuit connected between said switching means and earth, transmitting the charge and discharge currents of the line capacities of the network appearing during the switching on each pole;

means for obtaining a variable rectified signal from said charge and discharge currents of the line capacities of the network;

and means for transforming the variable current circulating in said detection circuit at each switching operation to a signal which cancels out the variations of said rectified signal.

2. Apparatus for ensuring the protection and supervision of the insulation of a direct-current electrical network, the two poles of which are insulated from earth, comprising:

a reversing relay for alternately connecting each of the two poles of the network to earth at a frequency less than one second;

a detection circuit connected between said reversing relay and earth;

a resistance connected in series in said detection circuit and to the terminals of which is connected a first rectifier device loaded by a resistance;

the primary of a transformer also connected in series in said detection circuit, and having its secondary connected to the terminals of a second rectifier device loaded by a resistance;

a galvanometer device connecting the two said rectifier devices in opposition;

and a condenser connected to the terminals of said galvanometer device.

3. Apparatus as claimed in claim 2, in which said reversing relay is able to effect at least three switching cycles per second.

4. Apparatus as claimed in claim 2, in which said reversing relay is of the electro-magnetic type operated by a multi-vibrator.

5. Apparatus as claimed in claim 2, in which said reversing relay is of the type having two photo-resistances with alternate illumination.

6. Apparatus as claimed in claim 2, in which said galvanometer device is constituted by a milliammeter provided with a limit contact which, for a pre-determined value of insulation fault, causes the operation of an alarm device and, when so required, the tripping of a circuit-breaker device controlling the network to be protected.

7. Apparatus for ensuring the protection and supervision of the insulation of a direct-current electrical network, the two poles of which are insulated from earth, comprising:

a reversing relay for alternately connecting each of the two poles of said network to earth at a frequency less than one second;

a detection circuit connected between said reversing relay and earth;

a resistance connected in series in said detection circuit and to the terminals of which is connected a first rectifier device loaded by a resistance;

the primary of a transformer also connected in series in said detection circuit, and having its secondary connected to the terminals of a second rectifier device loaded by a resistance;

a milliammeter connected between the two said rectifier devices connected in opposition, said milliammeter being provided with a limit contact which, for a pre-determined value of insulation fault, causes the operation of an alarm device, and, when so required, the tripping of a circuit-breaker device controlling the network to be protected;

and a condenser connected to the terminals of said milliammeter.

References Cited by the Examiner

UNITED STATES PATENTS

| 2,569,990 | 10/1951 | Harter | 324—54 |
| 2,700,125 | 1/1955 | King et al. | 317—18 X |
| 3,025,414 | 3/1962 | McVey. | |
| 3,072,844 | 1/1963 | Doll | 324—54 |
| 3,158,785 | 10/1964 | Gagniere et al. | 317—18 |
| 3,159,825 | 12/1964 | Bianchi et al. | 340—248 |

FOREIGN PATENTS 1,271,689  8/1961  France.

SAMUEL BERNSTEIN, *Primary Examiner.*

R. V. LUPO, *Assistant Examiner.*